(12) United States Patent
So et al.

(10) Patent No.: US 12,292,532 B2
(45) Date of Patent: May 6, 2025

(54) VEHICLE RADAR SYSTEM AND TARGET DETECTION

(71) Applicant: SAMSUNG ELECTRO-MECHANICS CO., LTD., Suwon-si (KR)

(72) Inventors: Won Wook So, Suwon-si (KR); Gilha Lee, Suwon-si (KR); Taegyu Ryu, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 337 days.

(21) Appl. No.: 17/864,137

(22) Filed: Jul. 13, 2022

(65) Prior Publication Data

US 2023/0152425 A1    May 18, 2023

(30) Foreign Application Priority Data

Nov. 16, 2021    (KR) .................. 10-2021-0157683

(51) Int. Cl.
| | | |
|---|---|---|
| *G01S 7/41* | (2006.01) | |
| *G01S 13/42* | (2006.01) | |
| *G01S 13/52* | (2006.01) | |
| *G01S 13/931* | (2020.01) | |

(52) U.S. Cl.
CPC .............. *G01S 7/415* (2013.01); *G01S 7/411* (2013.01); *G01S 13/42* (2013.01); *G01S 13/52* (2013.01); *G01S 13/931* (2013.01)

(58) Field of Classification Search
CPC .......... G01S 7/415; G01S 7/411; G01S 13/42; G01S 13/52; G01S 13/931
See application file for complete search history.

(56) References Cited

U.S. PATENT DOCUMENTS

| | | | | |
|---|---|---|---|---|
| 2013/0307718 | A1* | 11/2013 | Aoki .................. | G01S 7/354 342/61 |
| 2014/0329520 | A1* | 11/2014 | Militano ............... | G01S 5/0258 455/422.1 |
| 2018/0376124 | A1* | 12/2018 | Zhou ................... | G02B 27/0172 |
| 2019/0339349 | A1* | 11/2019 | Harrison ............... | G01S 5/021 |
| 2020/0132826 | A1 | 4/2020 | Achour | |
| 2020/0163040 | A1* | 5/2020 | Trichopoulos ........ | G01S 5/0273 |
| 2020/0249345 | A1* | 8/2020 | Alenljung ............. | G01S 7/415 |
| 2021/0097309 | A1* | 4/2021 | Kaku ................... | G06V 10/764 |
| 2021/0116560 | A1 | 4/2021 | Gulati et al. | |
| 2021/0389447 | A1* | 12/2021 | Shams .................. | G01S 13/82 |

(Continued)

OTHER PUBLICATIONS

K.-P.-H. Thai et al., "Around-the-corner radar: Detection and localization of a target in non-line of sight," 2017 IEEE Radar Conference (RadarConf), Seattle, WA, USA, 2017, pp. 0842-0847, doi: 10.1109/RADAR.2017.7944320. keywords: {Doppler effect; Radar detection;Delays;Radar imaging; Buildings}, (Year: 2017).*

*Primary Examiner* — Bernarr E Gregory
*Assistant Examiner* — Hailey R Le
(74) *Attorney, Agent, or Firm* — NSIP Law

(57) ABSTRACT

A method for detecting a moving target through a vehicle radar system includes acquiring radar data from a radar sensor disposed with respect to a vehicle, and using the radar data to detect a plane of a structure. The method also includes setting a reference classification line based on the detected plane, and determining whether the moving target is in a line of sight (LOS) area or a non-line of sight (NLOS) area based on the reference classification line.

16 Claims, 8 Drawing Sheets

(56) References Cited

U.S. PATENT DOCUMENTS

| | | | |
|---|---|---|---|
| 2022/0236396 A1* | 7/2022 | Choi | G01S 5/0218 |
| 2023/0168359 A1* | 6/2023 | Rezvani | G01S 13/003 |
| | | | 342/54 |

* cited by examiner

VEHICLE RADAR SYSTEM AND TARGET DETECTION

CROSS-REFERENCE TO RELATED APPLICATION

This application claims the benefit under 35 USC 119(a) of Korean Patent Application No. 10-2021-0157683 filed in the Korean Intellectual Property Office on Nov. 16, 2021, the entire disclosure of which is incorporated herein by reference for all purposes.

BACKGROUND

1. Field

This application relates to a vehicle radar system and a target detecting method thereof.

DESCRIPTION OF THE BACKGROUND

For safety of vehicles and pedestrians, vehicles are equipped with various sensors such as ultrasonic waves, cameras, radars, and lidar that recognize a surrounding environment. These sensors may detect people, vehicles, animals, moving objects, etc. within a line of sight (LOS) area. On the other hand, a front camera used in the vehicle can sense the surrounding environment at a long distance and a short distance by using a plurality of cameras having a field of view (FOV) of a narrow angle and a wide angle.

In vehicles equipped with the radar, a corner radar may be mounted on the front bumper of the vehicle to widen the detecting range. The corner radar mounted on the right side of the vehicle bumper mainly detects the target approaching from the right lane or the right side of the intersection, and the corner radar mounted on the left side of the vehicle bumper mainly detects the target approaching from the left lane or the left side of the intersection.

The above information is presented as background information only to assist with an understanding of the present disclosure. No determination has been made, and no assertion is made, as to whether any of the above might be applicable as prior art with regard to the disclosure.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for detecting a moving target through a vehicle radar system includes acquiring radar data from a radar sensor disposed with respect to a vehicle, using the radar data to detect at least one plane of at least one structure, setting at least one reference classification line based on the at least one plane of the at least one structure, and determining whether the moving target is in a line of sight (LOS) area or a non-line of sight (NLOS)) area based on the at least one reference classification line.

The determining may include determining that the moving target is in the NLOS area when the radar data for the moving target is positioned beyond a predetermined distance from the vehicle based on the at least one reference classification line.

The determining may include determining that the moving target is in the LOS area when the radar data for the moving target is positioned within a predetermined distance of the vehicle based on the at least one reference classification line.

The setting may include calculating at least one plane reference line based on the at least one plane. The setting may also include setting the at least one plane reference line to be parallel to the traveling direction of the vehicle among a plurality of plane reference lines as the at least one reference classification line.

The calculating may include calculating a first plane reference line corresponding to a plane of a first structure on the right of the vehicle, and calculating a second plane reference line corresponding to a plane of a second structure on the left of the vehicle. The setting of the at least one reference classification line may include setting the first plane reference line as a first reference classification line, and setting the second plane reference line as a second reference classification line.

The method may further include dividing the radar data into a right area and a left area based on the center of the vehicle.

The determining may include determining that the moving target is in the NLOS area when the radar data for the moving target indicates that the moving target is in the right area and the moving target is positioned beyond a predetermined distance from the vehicle based on the first reference classification line, and determining that the moving target is in the NLOS area when the radar data for the moving target is the left area and the moving target is positioned beyond a predetermined distance from the vehicle based on the second reference classification line.

The method may further include mirroring radar data positioned beyond a predetermined distance from the vehicle based on the plane reference line based on the plane reference line.

The acquiring may include converting a relative coordinate system corresponding to a position in which the radar sensor is installed into an absolute coordinate system to acquire the radar data.

The at least one plane of the at least one structure may be at least one of a wall surface of a building, a guard rail, a billboard, and a side of a parked or stopped vehicle.

According to another aspect, a vehicle radar system includes a radar sensor that is installed in a vehicle and acquires radar data, and a target determining device that detects at least one plane of at least one structure through the radar data to set at least one reference classification line, and determines whether a moving target is in a non-line of sight (NLOS) area based on the at least one reference classification line.

The target determining device may be configured to determine that the moving target is in the NLOS area when the radar data corresponding to the moving target indicates that the moving target is located beyond a predetermined distance away from the vehicle based on the at least one reference classification line.

The target determining device may be configured to determine that the moving target is in the line of sight (LOS) area when the radar data corresponding to the moving target indicates that the moving target is positioned within a predetermined distance of the vehicle based on the at least one reference classification line.

The target determining device may be configured to calculate at least one plane reference line by using the at least one plane, and to set at least one of the at least one plane reference line to be parallel to a direction in which the vehicle travels as at least one of the at least one reference classification line.

The plane reference line may include a first plane reference line corresponding to a plane of a first structure positioned on the right side of the vehicle and a second plane reference line corresponding to a plane of a second structure positioned on the left side of the vehicle, and the target determining device may set the first plane reference line as a first reference classification line and the second plane reference line as a second reference classification line.

The target determining device may determine that the moving target is in the NLOS area when the radar data corresponding to the moving target indicates that the moving target is in an area right of the center of the vehicle and is located beyond a predetermined distance from the vehicle based on the first reference classification line. The target determining device may also be configured to determine that the moving target is in the NLOS area when the radar data corresponding to the moving target indicates that the moving target is in an area left of the center of the vehicle and is positioned beyond a predetermined distance from the vehicle based on the second reference classification line.

The target determining device may mirror the radar data indicating that the moving target is positioned beyond a predetermined distance from the vehicle with respect to the at least one plane reference line.

The target determining device may convert the relative coordinate system corresponding to the position where the radar sensor is installed into a predetermined absolute coordinate system to convert the radar data into radar data for the absolute coordinate system.

The at least one plane of the at least one structure may be at least one of a wall surface of a building, a guard rail, a billboard, and a side of a parked or stopped vehicle.

A method of detecting a moving target in a vehicle radar system is provided. The method includes acquiring radar data from a radar sensor disposed on a vehicle, detecting one or more planes of one or more structures from the radar data, setting one or more reference classification lines corresponding to the one or more planes, and determining whether the moving target is in a line of sight (LOS) area or a non-line of sight (NLOS) area based on the one or more reference classification lines.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF THE EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Figure 1:
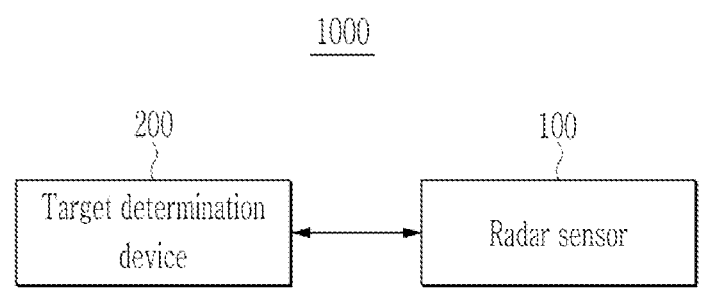
FIG. 1 is a block diagram showing an example of a vehicle radar system.

FIG. 1 is a block diagram showing a vehicle radar system 1000 according to an example.

As shown in FIG. 1, a vehicle radar system 1000 according to an example may include a radar sensor 100 and a target determination device 200.

In many instances, sensors may not be able to detect people or vehicles that are obscured by buildings, walls, and adjacent vehicles, which increases a likelihood of a crash. That is, the sensors mounted on the vehicles can detect a target within the line of sight (LOS) area, but cannot detect a target within a non-line of sight (NLOS) area. Additionally, corner radars cannot detect the targets that are hidden by buildings, fences, soundproof walls, or parked vehicles positioned on the left and right of the vehicle. Radar sensors 100 may be installed on a vehicle to reduce these potential problems.

The radar sensor 100 may be installed at a predetermined position of the vehicle (for example, on or within the vehicle, etc.). As an example, the radar sensor 100 may be installed near a front bumper and a front rearview mirror of the vehicle. The radar sensor 100 may include at least one radar sensor. The radar sensor 100 may emit a transmission beam to a predetermined range from the installed position and receive a reflected beam reflected by an object. The radar sensor 100 transmits radar data, which includes information on the transmission beam and the reflected beam, to the target determining device 200. The radar sensor 100 may be configured to and operate in a manner to collect, determine, transform, and/or transmit, etc., the radar data in a compatible form to the target determining device 200, and the detailed description is omitted.

The target determining device 200 receives the radar data from the radar sensor 100, and may use the received radar data to determine whether the moving target is in the line of sight (LOS) area or the non-line of sight (NLOS) area. The moving target may be a moving object, such as a person, a bicycle, or a vehicle (for example, as illustrated with respect to FIG. 5 and described with respect to FIG. 5 herein below). First, the target determining device 200 may detect a plane of a fixed structure (e.g., a wall, guard rail, billboard, side of a parked or stopped vehicle, etc.) by using radar data and use the detected plane to determine a reference classification line. The target determining device 200 may determine whether the moving target is in the LOS area or the NLOS area based on the reference classification line. According to an example embodiment, the target determining device 200 may provide information determined on the moving target to an autonomous driving system installed in the vehicle. Alternatively, the vehicle radar system 1000 may be included in the autonomous driving system. The specific operation of the target determining device 200 is described in more detail below.

Figure 2:
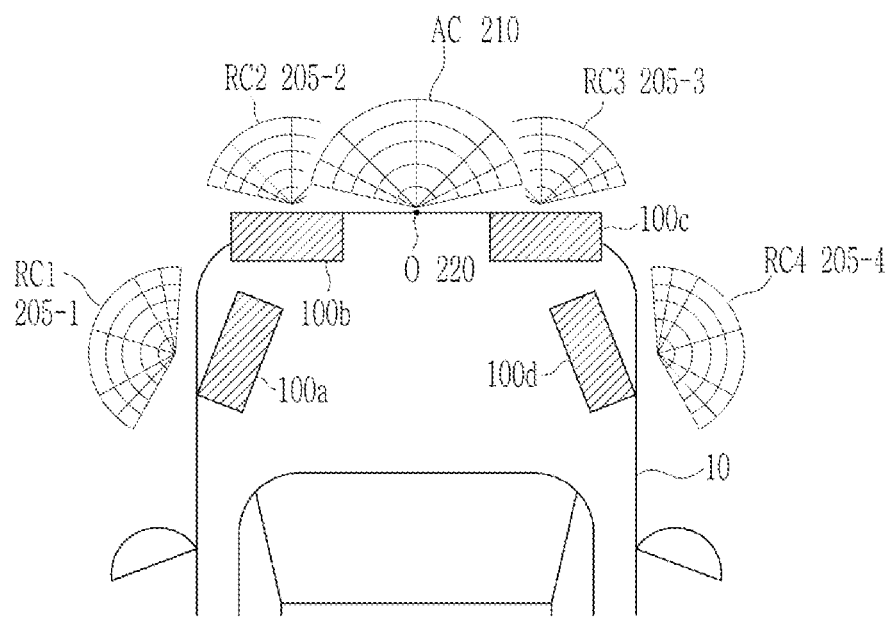
FIG. 2 is a view illustrating an example of a mounting position of a radar sensor.

FIG. 2 is a view illustrating an example of a mounting position of a radar sensor 100.

The radar sensor 100 may include multiple radar sensors, for example, four radar sensors 100a to 100d, such as illustrated in FIG. 2. Alternatively, the radar sensor 100 may include more or fewer radar sensors 100. The radar sensor 100a may be installed in the left corner of the vehicle 10, and the radar sensor 100d may be installed in the right corner of the vehicle 10. That is, the radar sensors 100a and 100d may be corner radar sensors. The radar sensor 100b may be installed on the front left (the left of the bumper) of the vehicle 10, and the radar sensor 100c may be installed on the front right (the right of the bumper) of the vehicle 10. In the following description, for convenience, it is assumed that there is a plurality of radar sensors 100 (e.g., four radar sensors), but the following description may be applied in instances in which there is a single radar sensor 100.

The radar sensors 100a to 100d may have a relative coordinate (RC) area according to each install position. Referring to FIG. 2, each of the radar sensors 100a to 100d may respectively have a relative coordinate system (RCS) that determines a relative coordinate area, such as relative coordinate areas RC1 205-1 to RC4 205-4 based on (for example, determined relative to) an installed central position. The radar data obtained from each radar sensor 100a to 100d may be data based on each relative coordinate system, which may be converted, in some instances, into data compatible with an absolute coordinate system (ACS) (which may determine an absolute coordinate (AC) 210 area). Accordingly, the target determining device 200 may convert the radar data obtained from the radar sensors 100a to 100d into the absolute coordinate system and integrate them. As an example, the absolute coordinate system may be an absolute coordinate system AC based on the center point O 220 of the bumper of the vehicle 10. As another example, the absolute coordinate system may be set to (for example, use as a reference) any one of the relative coordinate systems RC1 205-1 to RC4 205-4.

Figure 3:
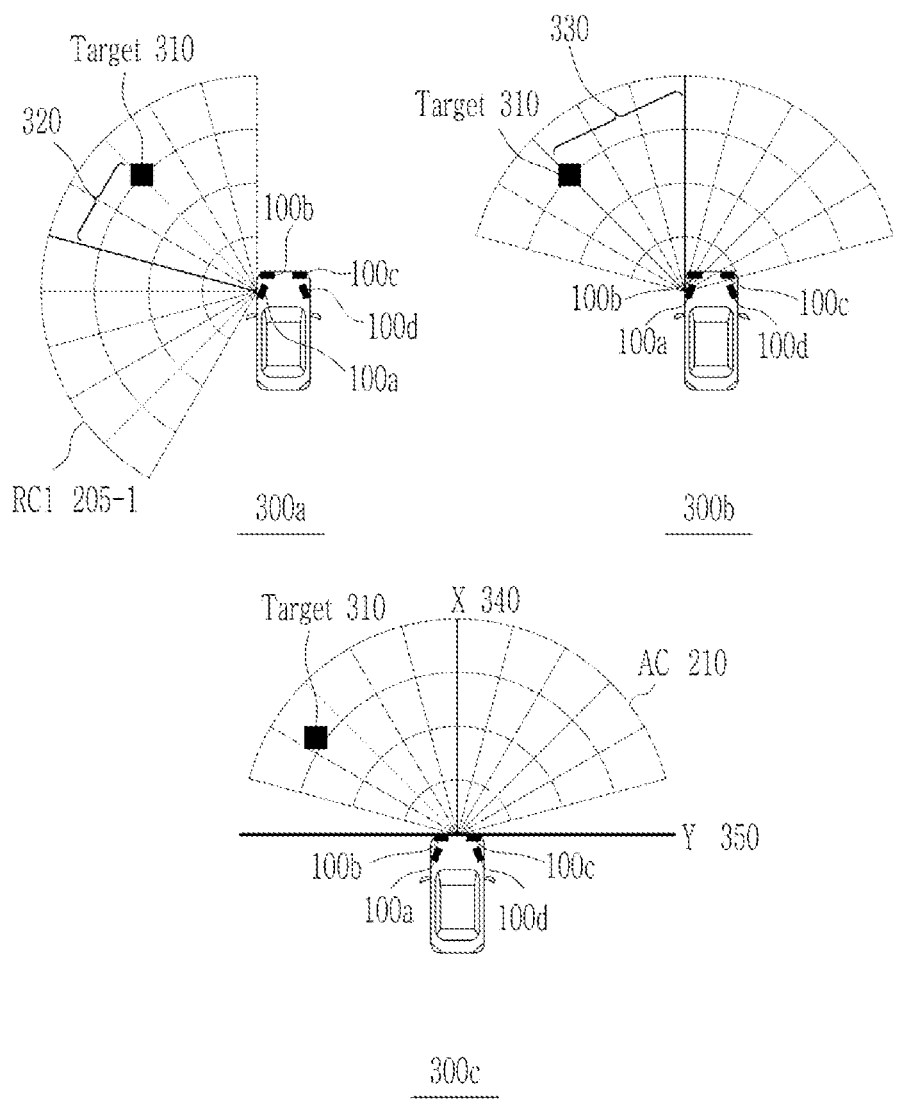
FIG. 3 is a view illustrating an example of a method for converting a relative coordinate system to an absolute coordinate system.

FIG. 3 is a view illustrating an example of a radar sensor converting coordinates from a relative coordinate system to an absolute coordinate system.

As shown in 300a of FIG. 3, the radar sensor 100a may obtain radar data (for example, Cartesian coordinates, X (340), Y (350), relative angle (320), etc.) for the target 310 based on the relative coordinate system RC1 205-1. As shown in 300b of FIG. 3, the target determining device 200 may convert a relative angle (of the target 310) into an absolute angle (330). Also, as shown in 300c of FIG. 3, the target determining device 200 converts the relative coordinate into the absolute coordinate (for example, based on cartesian coordinates relative to the central point O 220 (not separately shown in FIG. 3). The target determining device 200 may determine the position of each radar sensor 100a to 100d (for example, based on the install position provided in advance) and converts the data based on the relative coordinate system provided by each radar sensor 100 into data based on the absolute coordinate system by computing an offset, etc., thereby integrating the radar data.

Hereinafter, a method for detecting whether the moving target is positioned in the LOS area or the NLOS area by the vehicle radar system 1000 is described in detail. The method may allow a system to detect targets that are obscured by buildings, walls, vehicles, etc.

Figure 4:
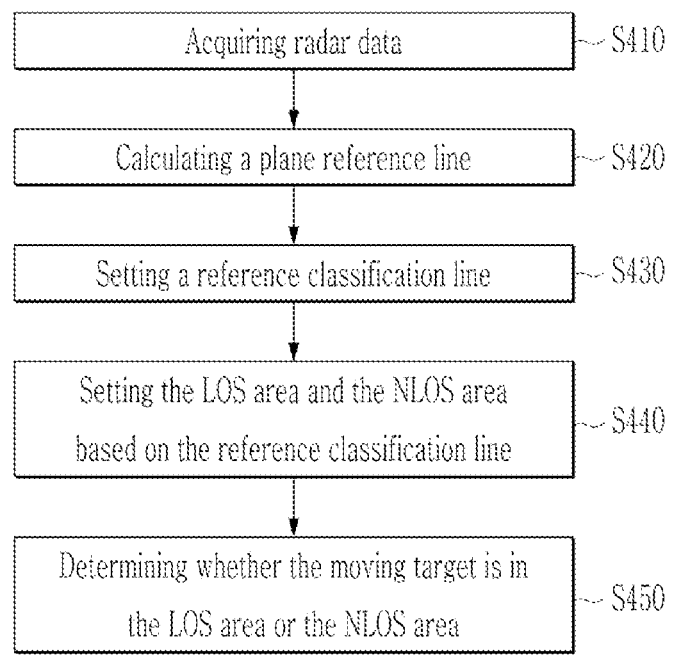
FIG. 4 is a flowchart showing a method of detecting a target, which may be implemented by a vehicle radar system according to an example.

FIG. 4 is a flowchart showing a method of detecting a target, which may be implemented by vehicle radar system 1000, according to an example.

The vehicle radar system 1000 may acquire the radar data through the radar sensor 100 (S410). The radar sensors 100a to 100d each emit a transmission beam in a predetermined range and receive a reception beam to acquire the radar data. The radar sensors 100a-100d may transmit the radar data to the target determining device 200. Here, the target determining device 200 may convert the radar data into data based on the absolute coordinate system. That is, the target determining device 200, as shown in FIG. 3, may convert the radar data of the relative coordinate system acquired by each radar sensor 100a to 100d into the radar data of the absolute coordinate system.

Figure 5:
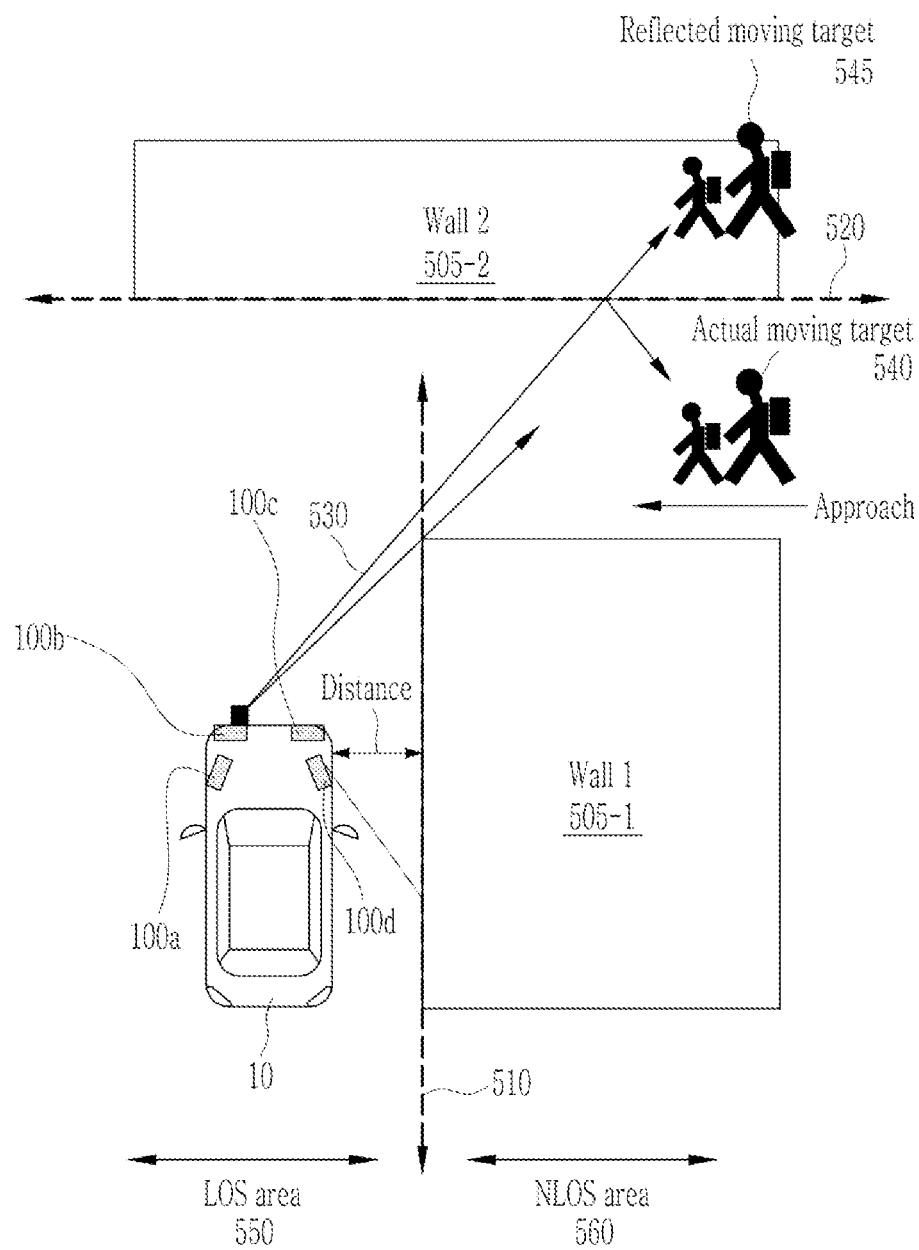
FIG. 5 illustrates a scenario of calculating a plane reference line according to an example.

The vehicle radar system 1000 may detect the plane of a fixed structure by using the radar data acquired in the step (S410) and calculate a plane reference line by using the detected plane (S420). For example, the plane of the fixed structure may be a wall surface of a building, a guard rail, a billboard, or a side of the parked or stopped vehicle. The method of detecting the plane of the fixed structure and calculating the plane reference line through the vehicle radar system 1000 is described with reference to FIG. 5. FIG. 5 describes a case in which the plane of the fixed structure is the wall surface of the building, however the process described herein may also be applied to other fixed structure, such as a guard rail, a billboard, the side of a parked or stopped vehicle, etc.

FIG. 5 illustrates a scenario of calculating a plane reference line, according to an example.

In FIG. 5, it is assumed that a wall 1 505-1 is positioned on the right side in the traveling direction of the vehicle 10 and a wall 2 505-2 is positioned in the front side.

The radar sensor 100d may acquire the radar data reflected by the wall surface 1 505-1, and this radar data has a constant distance 515 and a constant angle from the position of the vehicle 10. Accordingly, the target determining device 200 may detect the wall surface 1 505-1 and calculate the plane reference line 510 formed along the wall surface 1 505-1. The target determining device 200 may detect the wall surface and calculate the wall surface reference using any suitable process compatible with the features disclosed herein.

The radar sensor 100b may acquire the radar data reflected by the wall surface 2 505-2, and this radar data also has a constant distance and a constant angle from the position of the vehicle 10. Accordingly, the target determining device 200 may detect the wall surface 2 505-2 and calculate a plane reference line 520 formed along the wall surface 2 505-2.

On the other hand, as shown in FIG. 5, when the moving target 540 approaches, the radar sensor 100b may acquire the radar data for the moving target 540 by the radar beam 530. The radar data obtained by the radar sensor 100b is not data found by a direct radar beam, but data found by a reflected radar beam. That is, the radar data acquired by the radar sensor 100b is not data about the actual position of the moving target 540, but data about the reflected moving target 545. Accordingly, it is necessary to convert the data on the reflected moving target 545 into the data on the actual moving target 540. The target determining device 200 determines the radar data positioned far from the vehicle 10 based on the plane reference line 520 as the data acquired by the reflected signal. Accordingly, the target determining device 200 may mirror the data on the reflected moving target with respect to the plane reference line 520 to be converted into the data for the actual moving target.

Referring to FIG. 4, the vehicle radar system 1000 may set the reference classification line among the plane reference lines calculated in the step S420 (S430). As in the case of FIG. 5, a plurality of plane reference lines may be calculated. The vehicle radar system 1000 may set the reference classification line according to a predetermined reference among a plurality of plane reference lines. As an example, the vehicle radar system 1000 may set the plane reference line parallel to the traveling direction of the vehicle among the plane reference lines as the reference classification line. As another example, the vehicle radar system 1000 may set the plane reference line that maintains a certain angle with the traveling direction of the vehicle among the plane reference lines as the reference classification line. That is, in the case of FIG. 5, the vehicle radar system 1000 may set the plane reference line 510 parallel to the traveling direction of the vehicle among the plane reference line 510 and the plane reference line 520 as the reference classification line.

Next, the vehicle radar system 1000 may set the LOS area 550 and the NLOS area 560 based on the reference classification line set in the step S430 (S440). The vehicle radar system 1000 may set an area close to the vehicle 10 as the LOS area 550 based on the reference classification line, and set an area far from the vehicle 10 as the NLOS area based on the reference classification line. Referring to FIG. 5, the vehicle radar system 1000 may set the left area of the reference classification line 510 as the LOS area 550 and the right area of the reference classification line 510 as the NLOS area.

The vehicle radar system 1000 may determine whether the moving target is in the LOS area 550 or the NLOS area 560 (S450). The vehicle radar system 1000 may determine that the moving target is in the LOS area 550 when the radar data of the moving target 540 is in the LOS area 550. Also, the vehicle radar system 1000 may determine that the moving target 540 is in the NLOS area 550 when the radar data of the moving target 540 is in the NLOS area. Referring to FIG. 5, the target determining device 200 may calculate the actual position of the moving target 540 from the radar data for the actual moving target. Also, since the actual position of the moving target 540 is located in the NLOS area 550, the target determining device 200 may finally determine that the moving target is in the NLOS area 550.

Next, implementation of target detecting by the vehicle radar system 1000 in instances in which four wall surfaces are disposed similarly to an environment of an intersection is described with reference to FIG. 6.

Figure 6:
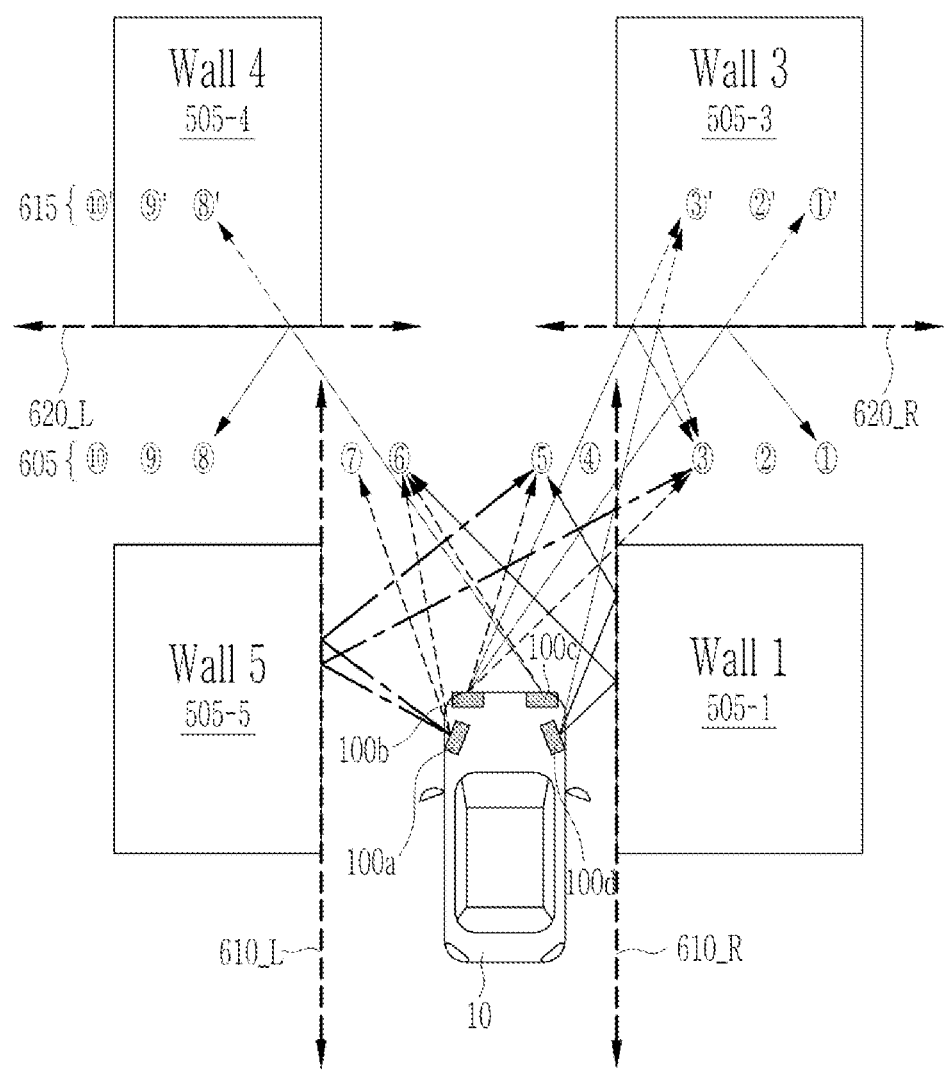
FIG. 6 is a view showing an example scenario of detecting a target by a vehicle radar system.

FIG. 6 is a view showing an example scenario of detecting a target by the vehicle radar system 1000.

In FIG. 6, positions (605, 615) associated with the target are illustrated by circled numbers with numbers ① to ⑩ indicating the actual positions 605 of the moving target, and circled numbers with an apostrophe, for example, ①', ②', ③', ⑧', ⑨', and ⑩' indicating the reflected position 615 of the moving target. Corresponding numbers indicate a corresponding actual position 605 and reflected position 615. For example, ①' indicates the reflected position 615 corresponding to the actual position 605 ①. Also, in FIG. 6, It is assumed that the wall surface 1 505-1 is positioned on the right side, the wall surface 5 505-5 is positioned on the left side, and the wall surfaces 3 505-3 and 4 505-4 are positioned in the front side of the vehicle 10 in the moving direction of the vehicle 10.

The vehicle radar system 1000, in a similar manner as described with respect to FIG. 4 and FIG. 5, may detect the plane reference line. That is, the vehicle radar system 1000 may detect the plane reference lines 610_R, 610_L, 620_R, and 620_L indicated in FIG. 6. The plane reference line 610_R is the plane reference line for the wall surface 1 505-1 on the right side of the vehicle 10, and the plane reference line 610_L is the plane reference line for the wall surface 5 505-5 on the left side of the vehicle 10. Also, the plane reference line 620_R is the plane reference line for the wall surface 3 505-3, and the plane reference line 620_L is the plane reference line for the wall surface 4 505-4. Here, since the radar sensor 100d may mainly detect the wall surface 1, the radar sensor 100d may be used to detect the plane reference line 610_R. Also, since the radar sensor 100a may mainly detect the wall surface 5 505-5, the radar sensor 100a may be used to detect the plane reference line 610_L.

The vehicle radar system 1000, in a similar manner as described with respect to FIG. 4 and FIG. 5, may set the reference classification line among a plurality of detected plane reference lines. Since the plane reference lines 610_R and 610_L are determined parallel to the traveling direction of the vehicle 10, the vehicle radar system 1000 may set the plane reference lines 610_R and 610_L as the reference classification lines, respectively. Meanwhile, the vehicle radar system 1000 may be divided into a right area and a left area with respect to the center O 220 of the absolute coordinate system. In addition, the vehicle radar system 1000 may set the reference classification line 610_R positioned in the right area as a reference classification line 610_R on the right, which is the reference classification line for classifying the radar data in the right area. The vehicle radar system 1000 may set the reference classification line 610_L positioned in the left area as a left reference classification line 610_L, which may be the reference classification line for classifying the radar data in the left area.

The vehicle radar system 1000, as described in FIG. 5, may mirror the signals for the reflected positions 615 ①', ②', ③', ⑧', ⑨', and ⑩', which are determined based on data acquired by the reflected signal reflected by the wall surface. The vehicle radar system 1000 may mirror the signals based on the plane reference line to convert the data into data corresponding to the actual moving target 540. The vehicle radar system 1000 mirrors the radar data corresponding to the reflected positions 605-615 ①', ②', and ③' based on the plane reference line 620_R to be converted into the radar data for the actual moving target 540. Further, the vehicle radar system 1000 mirrors the radar data corresponding to the reflected positions 605-615 ⑧', ⑨', and ⑩' based on the plane reference line 620_L to be converted into the radar data for the actual moving target 540.

The vehicle radar system 1000, in a similar manner as described with respect to FIG. 4 and FIG. 5, may determine whether the moving target is in the LOS area 550 or the NLOS area 560 based on the reference classification line.

The vehicle radar system 1000 may determine that the moving target is positioned in the right area on the basis of the reference classification line 610_R on the right. If the moving target 540 is in positions 605 ①, ②, and ③, the moving target is located far from the vehicle 10 based on the reference classification line 610_R on the right, so the vehicle radar system 1000 may determine that the moving target 540 is positioned in the NLOS area 560. When the moving target 540 is in the positions 605 ④ and ⑤, it is positioned close to the vehicle 10 based on the reference classification line 610_R on the right, so the vehicle radar system 1000 may determine that the moving target 540 is positioned in the LOS area 550.

The vehicle radar system 1000 may determine that the moving target is positioned in the left area on the basis of the reference classification line 610_L on the left. When the moving target 540 is at the positions ⑧, ⑨, and ⑩ it is located far (for example, beyond a predetermined distance) from the vehicle 10 based on the reference classification line 610_L on the left, so the vehicle radar system 1000 may determine that the moving target is located in the NLOS area 560. When the moving target is at the positions 605 ⑥ and ⑦, it is located close to (for example, within a predetermined distance of (e.g., a second that is the same or different to the predetermined distance used to determine whether the moving target is located in the NLOS area 560)) the vehicle 10 based on the reference classification line 610_L on the left, so the vehicle radar system 1000 may determine that the moving target 540 is located in the LOS area 550.

According to at least one of exemplary embodiments, the reference classification line may be set using the detected wall surface, and it may be determined whether the moving target is in the NLOS area based on the set reference classification line.

Hereinafter, the method for determining whether the moving target is in the LOS area or the NLOS area is described with reference to FIG. 7 in a different aspect from the above-described part.

Figure 7:
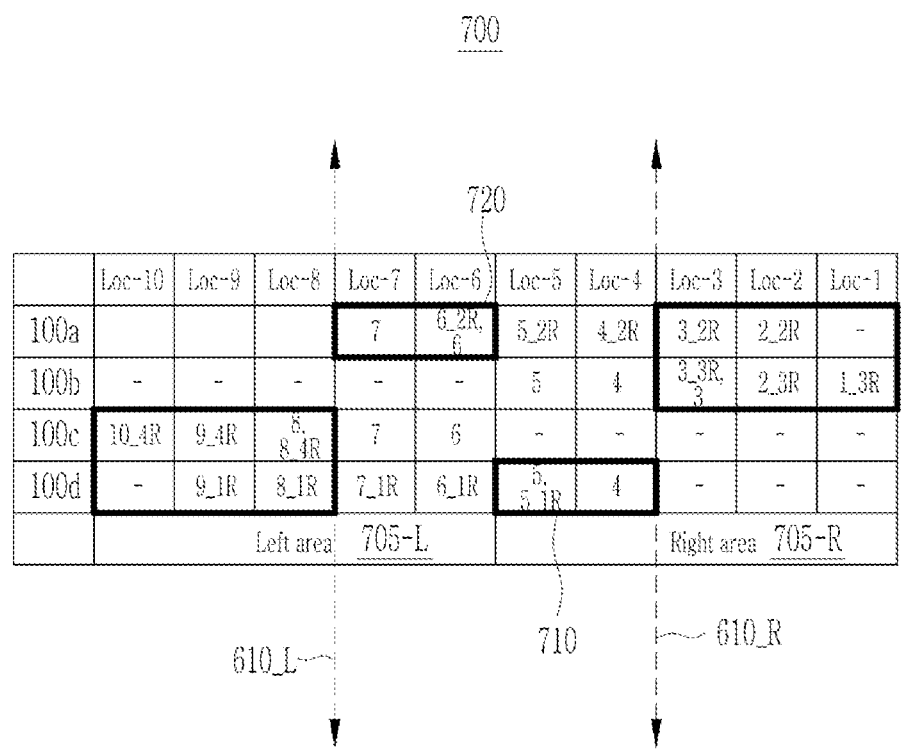
FIG. 7 is a table showing a classification result of a LOS area and an NLOS area for a case such as described with respect to FIG. 6.

FIG. 7 is a table 700 showing a classification result of a LOS area 550 and an NLOS area 560 for a case such as described with respect to FIG. 6.

In FIG. 7, Loc_x denotes a location of the moving target, with x denoting a position 605 of the moving target 540. For example, Loc-1 means that the moving target 540 is in the position 605 ①. The reflected signals are denoted by m_nR, where m denotes a position 605, and n denotes a wall surface. For example, 1_3R means the signal detected by the reflection of the wall surface 3 505-3 when the moving target 540 is in the position 605 ①. 2_2R means the signal detected by the reflection of the wall surface 2 505-2 when the moving target 540 is at the position 605 ②. Further, detection of the moving target 540 from direct positions is denoted by a single number. For example, 5 means the signal detected directly when the moving target is at the position 605 ⑤.

The vehicle radar system 1000 according to an example determines whether the moving target 540 is in the LOS area 550 or the NLOS area 560 by using a matrix such as illustrated and described with respect to FIG. 7.

According to an example embodiment, the vehicle radar system 1000 (particularly, the target determining device 200 of the vehicle radar system) may build a matrix such as illustrated in FIG. 7 for the radar data acquired through each radar sensor 100a to 100d. As shown in FIG. 7, the vehicle radar system 1000 may divide the areas associated with the vehicle 10 into a right area 705-R and a left area 705-L based on the origin O 220 of the absolute coordinate system.

The vehicle radar system 1000 may select a reference radar sensor from among the radar sensors 100a to 100d. As an example, the vehicle radar system 1000 may select the radar sensor mainly used to detect the plane of the fixed structure corresponding to the reference classification line as the reference radar sensor 100. In FIG. 6, the vehicle radar system 1000 may select the radar sensor 100d as the reference radar sensor for the right area 705-R in the right area 705-R. Also, the vehicle radar system 1000 may select the radar sensor 100a as the reference radar sensor for the left area 705-L in the left area 705-L.

The vehicle radar system 1000 may determine whether the moving target 540, positioned in the right area 705-R, is in the NLOS area 560 or the LOS area 550 based on the radar data of the reference radar sensor 100d. The target determining device 200 identifies the radar data acquired by a direct radar signal among the radar data of the reference radar sensor 100d. That is, the target determining device 200 may detect the radar data 710. The target determining device 200 may determine the positions 605 ④ and ⑤ of the moving target 540 corresponding to the radar data 710 as the LOS area 550. In addition, the target determining device 200 may determine the positions 605 ①, ②, and ③ of the moving target 540 as the NLOS area 560 and exclude the positions 605 ④ and ⑤ of the moving target 540.

The vehicle radar system 1000 may determine whether the moving target 540, positioned in the left area 705-L, is in the NLOS area 560 or the LOS area 550 based on the radar data of the reference radar sensor 100a. The target determining device 200 identifies (for example, detects, receives, etc.) the radar data acquired by the direct radar signal among the radar data of the reference radar sensor 100a. That is, the target determining device 200 identifies the radar data 720. The target determining device 200 may determine the positions 605 ⑥ and ⑦ of the moving target corresponding to the radar data 720 as the LOS area 550. Also, the target determining device 200 may determine the positions 605 ⑧, ⑨, and ⑩ of the moving target 540 excluding the positions 605 ⑥ and ⑦ of the moving target 540 as the NLOS area 560.

On the other hand, in FIG. 7, the reference classification line 610_R on the right and the reference classification line 610_L on the left may be displayed. In the right area 705-R, moving target(s) 540 at positions 605 ④ and ⑤ positioned to the left of the reference classification line 610_R on the right may be determined to be positioned in the LOS area 550, and moving targets at positions ①, ②, and ③ positioned on the right of the reference classification line 610_R on the right may be determined to be positioned in the NLOS area 560. Also, in the left area 705-L, the moving targets 540 at positions 605 ⑥ and ⑦ positioned on the right of the reference classification line 610_L on the left may be determined to be positioned in the LOS area 550, and the moving targets at positions 605 ⑧, ⑨, and ⑩ positioned on the left of the reference classification line 610_L on the left may be determined to be positioned in the NLOS area 560.

Although a scenario in which there are multiple radar sensors 100 has been described above, the above method may be applied in instances in which a single radar sensor is configured, and to determine whether the moving target is in the LOS area 550 or the NLOS area 560.

As described above, the vehicle radar system 1000 according to the example can determine whether the moving target is in the NLOS area 560 or the LOS area 550 by setting the reference classification line using the plane of the fixed structure. Accordingly, the vehicle radar system 1000 may prevent accidents in advance by notifying the information about the moving target 540 in the NLOS area 560 to the driver in advance.

Figure 8:
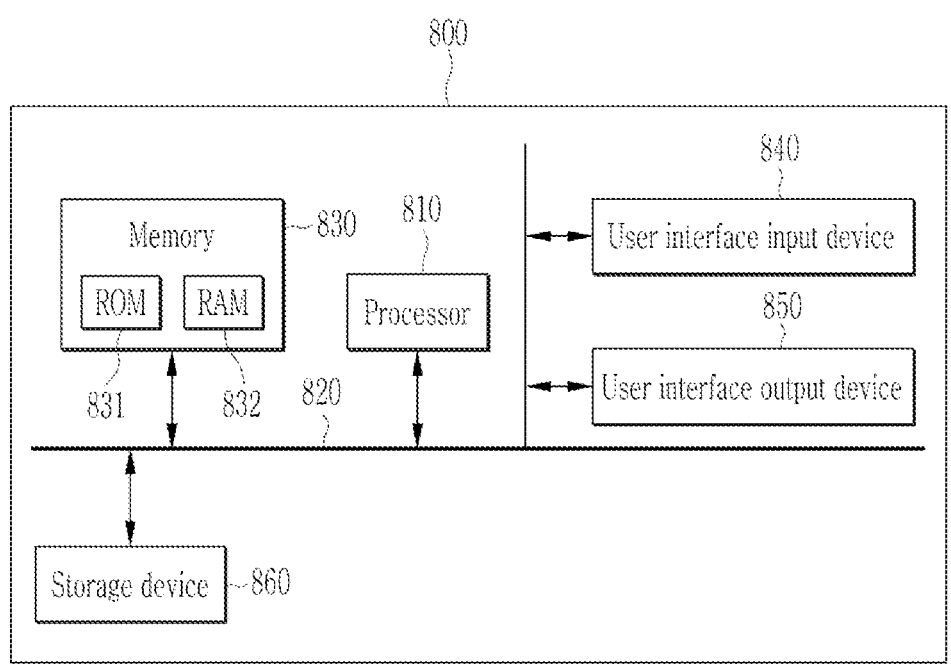
FIG. 8 is a view illustrating a computer system according to an example.

FIG. 8 is a view illustrating a computer system according to an example.

The vehicle radar system 1000 according to an example may be implemented into a computer system 800 such as illustrated in FIG. 8. Each constituent element of the vehicle radar system 1000, that is, the target determining device 200 and the radar sensor 100, may be implemented in the computer system 800 such as that in FIG. 8.

The computer system 800 may include at least one of a processor 810, a memory 830, a user interface input device 840, a user interface output device 850, and a storage device 860, which communicate through a bus 820.

The processor 810 may be a central processing unit (CPU) or a semiconductor device that executes instructions stored in the memory 830 or the storage device 860. The processor 810 may be configured to implement the functions and methods described in FIG. 1 to FIG. 7.

The memory 830 and the storage device 860 may include various types of volatile or non-volatile storage media. For example, the memory 830 may include a read only memory (ROM) 831 and a random-access memory (RAM) 832. In one example, the memory 830 may be positioned inside or outside the processor 810, and the memory 830 may be connected to the processor 810 through various known means.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for detecting a moving target through a vehicle radar system, comprising:
    acquiring radar data from a radar sensor disposed with respect to a vehicle;
    using the radar data to detect at least one plane of at least one structure;
    setting at least one reference classification line based on the at least one plane of the at least one structure; and
    determining whether the moving target is in a line of sight (LOS) area or a non-line of sight (NLOS) area based on the at least one reference classification line,
    wherein the at least one reference classification line is set based on a traveling direction of the vehicle,
    wherein the determining comprises:
    determining that the moving target is in the NLOS area when the radar data for the moving target is positioned beyond a predetermined distance from the vehicle based on the at least one reference classification line, and
    determining that the moving target is in the LOS area when the radar data for the moving target is positioned within a predetermined distance of the vehicle based on the at least one reference classification line.

2. The method of claim 1, wherein the setting includes:
    calculating at least one plane reference line based on the at least one plane; and
    setting the at least one plane reference line to be parallel to the traveling direction of the vehicle among a plurality of plane reference lines as the at least one reference classification line.

3. The method of claim 2, wherein the calculating includes:
    calculating a first plane reference line corresponding to a plane of a first structure on the right of the vehicle,
    calculating a second plane reference line corresponding to a plane of a second structure on the left of the vehicle, and
    wherein the setting of the at least one reference classification line includes:
    setting the first plane reference line as a first reference classification line, and
    setting the second plane reference line as a second reference classification line.

4. The method of claim 3, further comprising:
    dividing the radar data into a right area and a left area based on the center of the vehicle.

5. The method of claim 4, wherein the determining includes:
    determining that the moving target is in the NLOS area when the radar data for the moving target indicates that the moving target is in the right area and the moving target is positioned beyond a predetermined distance from the vehicle based on the first reference classification line, and
    determining that the moving target is in the NLOS area when the radar data for the moving target is in the left area and the moving target is positioned beyond a predetermined distance from the vehicle based on the second reference classification line.

6. The method of claim 2, further comprising
    mirroring radar data positioned beyond a predetermined distance from the vehicle based on the at least one plane reference line.

7. The method of claim 1, wherein the acquiring includes converting a relative coordinate system corresponding to a position in which the radar sensor is installed into an absolute coordinate system to acquire the radar data.

8. The method of claim 1, wherein the at least one plane of the at least one structure is at least one of a wall surface of a building, a guard rail, a billboard, and a side of a parked or stopped vehicle, and
    wherein the at least one structure is fixed.

9. A vehicle radar system, comprising:
    a radar sensor that is installed in a vehicle and acquires radar data; and
    a target determining device that detects at least one plane of at least one structure through the radar data to set at least one reference classification line, and determines whether a moving target is in a non-line of sight (NLOS) area based on the at least one reference classification line
    wherein the at least one reference classification line is set based on a traveling direction of the vehicle,
    wherein the target determining device is configured to:
    determine that the moving target is in the NLOS area when the radar data corresponding to the moving target indicates that the moving target is located beyond a predetermined distance away from the vehicle based on the at least one reference classification line, and determine that the moving target is in the line of sight (LOS) area when the radar data corresponding to the moving target indicates that the moving target is positioned within a predetermined distance of the vehicle based on the at least one reference classification line.

10. The vehicle radar system of claim 9, wherein the target determining device is configured to calculate at least one plane reference line by using the at least one plane, and to set at least one of the at least one plane reference line to be parallel to a direction in which the vehicle travels as at least one of the at least one reference classification line.

11. The vehicle radar system of claim 10, wherein the at least one plane reference line includes a first plane reference line corresponding to a plane of a first structure positioned on the right side of the vehicle and a second plane reference line corresponding to a plane of a second structure positioned on the left side of the vehicle, and wherein the target determining device is configured to set the first plane reference line as a first reference classification line and the second plane reference line as a second reference classification line.

12. The vehicle radar system of claim 11, wherein the target determining device is configured to:

determine that the moving target is in the NLOS area when the radar data corresponding to the moving target indicates that the moving target is in an area right of the center of the vehicle and is located beyond a predetermined distance from the vehicle based on the first reference classification line, and determine that the moving target is in the NLOS area when the radar data corresponding to the moving target indicates that the moving target is in an area left of the center of the vehicle and is positioned beyond a predetermined distance from the vehicle based on the second reference classification line.

13. The vehicle radar system of claim 10, wherein the target determining device is configured to mirror the radar data indicating that the moving target is positioned beyond a predetermined distance from the vehicle with respect to the at least one plane reference line.

14. The vehicle radar system of claim 9, wherein the target determining device converts the relative coordinate system corresponding to the position where the radar sensor is installed into a predetermined absolute coordinate system to convert the radar data into radar data for the absolute coordinate system.

15. The vehicle radar system of claim 9, wherein the at least one plane of the at least one structure is at least one of a wall surface of a building, a guard rail, a billboard, and a side of a parked or stopped vehicle.

16. A method of detecting a moving target in a vehicle radar system, comprising:

acquiring radar data from a radar sensor disposed on a vehicle;

detecting one or more planes of one or more structures from the radar data;

setting one or more reference classification lines corresponding to the one or more planes; and determining whether the moving target is in a line of sight (LOS) area or a non-line of sight (NLOS) area based on the one or more reference classification lines wherein the one or more reference classification lines are set based on a traveling direction of the vehicle, wherein the determining comprises:

determining that the moving target is in the NLOS area when the radar data for the moving target is positioned beyond a predetermined distance from the vehicle based on the at least one reference classification line; and determining that the moving target is in the LOS area when the radar data for the moving target is positioned within a predetermined distance of the vehicle based on the at least one reference classification line.

* * * * *